United States Patent
Li et al.

(10) Patent No.: US 10,681,582 B2
(45) Date of Patent: Jun. 9, 2020

(54) INFORMATION TRANSMISSION METHOD, BASE STATION, USER EQUIPMENT, AND STORAGE MEDIUM

(71) Applicant: CHINA MOBILE COMMUNICATIONS GROUP CO., LTD., Beijing (CN)

(72) Inventors: Nan Li, Beijing (CN); Nan Hu, Beijing (CN)

(73) Assignee: China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/068,591

(22) PCT Filed: Dec. 14, 2016

(86) PCT No.: PCT/CN2016/109921
§ 371 (c)(1),
(2) Date: Jul. 6, 2018

(87) PCT Pub. No.: WO2017/121221
PCT Pub. Date: Jul. 20, 2017

(65) Prior Publication Data
US 2019/0053086 A1    Feb. 14, 2019

(30) Foreign Application Priority Data

Jan. 11, 2016   (CN) .......................... 2016 1 0016298

(51) Int. Cl.
*H04W 24/10*    (2009.01)
*H04W 52/02*    (2009.01)
*H04W 68/02*    (2009.01)

(52) U.S. Cl.
CPC ....... *H04W 24/10* (2013.01); *H04W 52/0206* (2013.01); *H04W 52/0209* (2013.01); *H04W 68/02* (2013.01); *Y02D 70/00* (2018.01)

(58) Field of Classification Search
CPC . H04W 24/10; H04W 52/0209; H04W 68/02; Y02D 70/00
See application file for complete search history.

(56) References Cited

U.S. PATENT DOCUMENTS

2011/0096671 A1 * 4/2011 Lindstrom ............ H04W 76/18
370/242
2012/0100845 A1 * 4/2012 Mildh ............... H04W 52/0235
455/418

(Continued)

FOREIGN PATENT DOCUMENTS

CN    101370281 A    2/2009
CN    102461281 A    5/2012

(Continued)

OTHER PUBLICATIONS

International Search Report (ISR) and Written Opinion dated Mar. 1, 2017 in PCT/CN2016/019921, 8 pages, including English translation of ISR.

(Continued)

*Primary Examiner* — Lakeram Jangbahadur
(74) *Attorney, Agent, or Firm* — Arch & Lake LLP

(57) ABSTRACT

An information transmission method is provided. The method includes acquiring, by a base station, residence identification information from each User Equipment (UE) in an idle state, where the residence identification information is used to identify that the UE in the idle state resides in the base station.

15 Claims, 3 Drawing Sheets

(56) References Cited

U.S. PATENT DOCUMENTS

2012/0142328 A1    6/2012   Awoniyi et al.
2013/0308514 A1   11/2013   Yokoyama
2014/0155078 A1*   6/2014   Balageas ............... H04W 24/02
                                                     455/452.1

FOREIGN PATENT DOCUMENTS

CN        102857965 A  *  1/2013   ............ H04W 24/10
EP          2446672 A1     5/2012

OTHER PUBLICATIONS

Extended European Search Report issued to EP Patent Application No. 16884773.9, dated Aug. 6, 2019 (10p).
First Office Action issued to Chinese Patent Application No. 201610016298.4, dated Aug. 28, 2019 with English translation (14p).

* cited by examiner

US 10,681,582 B2

INFORMATION TRANSMISSION METHOD, BASE STATION, USER EQUIPMENT, AND STORAGE MEDIUM

CROSS-REFERENCE TO RELATED APPLICATION

This application is the U.S. national phase of PCT Application No. PCT/CN2016/109921 filed on Dec. 14, 2016, which claims a priority to Chinese Patent Application No. 201610016298.4 filed on Jan. 11, 2016, the disclosure of which is incorporated in its entirety by reference herein for all purposes.

TECHNICAL FIELD

The present disclosure relates to the field of wireless technology, in particular to an information transmission method, a base station, a User Equipment (UE), and a storage medium.

BACKGROUND

Currently, there are various communication networks, e.g., Global System for Mobile Communication (GSM) network, different Code Division Multiple Access (CDMA) networks (e.g., Wideband Code Division Multiple Access (WCDMA) network and CDMA 2000 network), and the $3^{rd}$ Generation Partnership Project Long Term Evolution (3GPP LTE) network. Along with the increase in the number of the communication networks and the geographical coverage of each communication network, power consumption of a base station becomes more important. Hence, it is necessary to reduce the power consumption of the base station.

In prior art, some energy-saving operations, e.g., a power-off operation, may be performed on the base station in accordance with the number of connected UEs in a cell. It is impossible for the base station to acquire the number of idle UEs within its coverage, so the user experience and services initiation for the idle UEs may probably be adversely affected by these operations. The connected UE refers to a UE in a connected state, while the idle UE refers to a UE in an idle state. The UE is also known as a terminal.

In an LTE network, the idle UE within an LTE cell may perform cell selection or cell re-selection. After the cell selection or cell-reselection, the idle UE may reside in a certain cell, and monitor system information and paging information. Except updating a Tracking Area (TA), the UE does not notify a resident cell of its existence. In other words, in most cases, the base station does not know the number of the idle UEs which reside in the base station. For a broadcast message from the LTE base station, System Information Blocks (SIBs) 3 to 8 are all configured to the cell selection or cell re-selection of the idle UE. In the case that the base station cannot know whether or not there are idle UEs residing therein or the number of the idle UEs residing therein, it is impossible for the base station to effectively reduce an overhead of the system information. In addition, in the case that the base station is capable of knowing a condition of the idle UE residing therein, it is able to ensure the service quality in a better manner during the energy-saving operations such as the power-off operation or an operation of stopping the transmission of some information. Further, in the case that the base station is capable of knowing identifiers of the idle UEs residing therein and reporting the identifiers to a network side, the network side may perform an accurate paging operation at a base station level as a downlink service arrives, so as to effectively reduce a paging overhead at the network side, and shorten a time delay for the service creation, without any necessity for the UE to update a paging area.

SUMMARY

In order to solve at least one problem in the prior art, the present disclosure provides an information transmission method, a base station, a UE and a storage medium, to reduce a paging overhead at a network side in accordance with a residence identifier of an idle UE, thereby to perform an accurate paging operation.

In one aspect, the present disclosure provides in some embodiments an information transmission method, including a step of acquiring, by a base station, residence identification information from a UE in an idle state. The residence identification information is used to indicate that the UE in the idle state resides in a coverage area of the base station.

In another aspect, the present disclosure provides in some embodiments an information transmission method, including steps of: performing, by a UE, idle state measurement for cell selection and cell re-selection; selecting, by the UE, a first base station in accordance with the idle state measurement and a cell selection criterion; and transmitting, by the UE, residence identification information to the first base station.

In yet another aspect, the present disclosure provides in some embodiments a base station, including a first acquisition unit configured to acquire residence identification information form a UE in an idle state. The residence identification information is used to indicate that the UE in the idle state resides in a coverage area of the base station.

In still yet another aspect, the present disclosure provides in some embodiments a UE, including: a measurement unit configured to perform idle state measurement for cell selection and cell re-selection; a selection unit configured to select a first base station in accordance with the idle state measurement and a cell selection criterion; and a second transmission unit configured to transmit residence identification information to the first base station.

In still yet another aspect, the present disclosure provides in some embodiments a computer storage medium storing therein a computer-executable instruction which is executed so as to implement the above-mentioned information transmission method at a base station side or a UE side.

In still yet another aspect, the present disclosure provides in some embodiments a base station, including a memory, a processor and a computer program stored in the memory and capable of running on the processor. The computer program is executed by the processor so as to implement the above-mentioned information transmission method at a base station side.

In still yet another aspect, the present disclosure provides in some embodiments a UE, including a memory, a processor and a computer program stored in the memory and capable of running on the processor. The computer program is executed by the processor so as to implement the above-mentioned information transmission method at a UE side.

According to the information transmission methods, the base station, the UE and the storage medium in the embodiments of the present disclosure, the base station acquires the residence identification information from the UE in the idle state, and the residence identification information is used to indicate that the UE in the idle state resides in the coverage area of the base station. The base station determines identifiers of the UEs in the idle state residing in the base station and/or the number of the UEs in the idle state residing in the base station in accordance with the residence identification information. The base station reports, to a network side, the identifiers of the UEs in the idle state residing in the base station or the identification information about the UEs in the idle state residing in the base station, or timestamp information about the transmission of the residence identification information by the UE, or timestamp information about the reception of the residence identification information by the base station. Hence, the network side may perform an accurate paging operation for the UE in accordance with such information, so as to reduce a paging overhead at the network side and shorten a time delay for the service creation.

DETAILED DESCRIPTION OF THE EMBODIMENTS

The present disclosure provides in some embodiments an information transmission method at a base station side, which includes steps of: acquiring, by a base station, residence identification information from each UE in an idle state, the residence identification information being used to indicate that the UE in the idle state resides in the base station; and determining, by the base station, identifiers of the UEs in the idle state residing in the base station and/or the number of the UEs in the idle state residing in the base station in accordance with the residence identification information.

The information transmission method further includes: reporting, by the base station, the identifiers of the UEs residing in the base station to a network side; or reporting, by the base station, the identifiers of the UEs residing in the base station to the network side, and timestamp information about the transmission of the residence identification information by the UE or timestamp information about the reception of the residence identification information by the base station.

Here, the network side may perform a paging operation for the UE in accordance with the identifiers of the UEs residing in the base station or the residence identification information about the UEs in the idle state, and the timestamp information about the transmission of the residence identification information from the UEs or the timestamp information about the reception of the residence identification information by the base station.

Correspondingly, the present disclosure further provides in some embodiments an information transmission method at a UE side, including steps of: performing, by a UE, idle state measurement for cell selection and cell re-selection; selecting, by the UE, a first base station in accordance with the idle state measurement and a cell selection criterion; and transmitting, by the UE, residence identification information to the first base station. Here, the first base station may be understood as a resident base station.

The present disclosure will be described hereinafter in more details in conjunction with the drawings and embodiments.

In order to solve the problems in the prior art, the present disclosure provides in some embodiments an information transmission method for use in a base station. A program code may be called by a processor of a base station so as to achieve functions of the information transmission method. The program code may be stored in a computer storage medium. Hence, the base station at least includes the processor and the storage medium.

Figure 1:
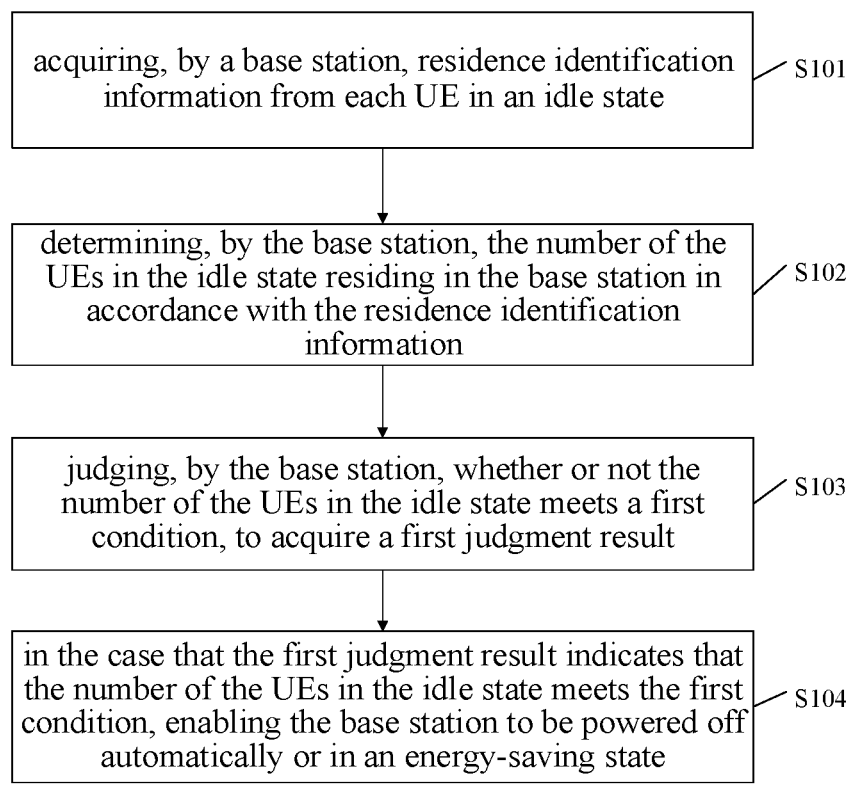
FIG. 1 is a flow chart of an information transmission method according to one embodiment of the present disclosure.

FIG. 1 is a flow chart of an information transmission method according to one embodiment of the present disclosure. As shown in FIG. 1, the information transmission method may include the following steps.

Step S101: acquiring, by the base station, residence identification information from each UE in an idle state, the residence identification information being used to indicate that the UE in the idle state resides in the base station.

Here, the residence identification information may be understood, to some extent, as identification information used to indicate that the UE resides in the base station. Based on this understanding, the residence identification information may be of various forms. For example, a new piece of information or an existing piece of information may be adopted as the residence identification information. In the case that the existing piece of information is adopted, reserved bits in the existing piece of information may be used to represent the residence identification information, and during the implementation, more than one reserved bits may be used. In addition, a specific sequence in the existing piece of information may also be used to represent the residence identification information.

Step S102: determining, by the base station, identifies of the UEs in the idle state residing in the base station and/or the number of the UEs in the idle state residing in the base station in accordance with the residence identification information.

Here, in the case that the residence identification information has been received from the UE in the idle state, the base station may take this UE as the UE in the idle state residing in the base station. Hence, the base station may determine the number of the UEs in the idle state residing in the base station in accordance with the number of pieces of residence identification information received by the base station.

Step S103: determining, by the base station, whether or not the number of the UEs in the idle state meets a first condition, so as to acquire a first judgment result.

Here, the first condition may be that the number of the UEs in the idle state is smaller than a first threshold and these UEs are located within a coverage area overlapped by a coverage area of another base station. When the base station determines that the number of the UEs in the idle state is smaller than the first threshold and these UEs are located within the coverage area overlapped by the coverage area of the other base station, the base station may be powered off.

Step S104: in the case that the first judgment result indicates that the number of the UEs in the idle state has met the first condition, enabling the base station to be powered off automatically or to be in an energy-saving state, or suspending, by the base station, the transmission of broadcast information for cell selection or cell re-selection by each UE in the idle state.

In a possible embodiment of the present disclosure, the information transmission method further includes, in the case that the first judgment result indicates that the number of the UEs in the idle state does not meet the first condition, terminating the entire procedure.

In a possible embodiment of the present disclosure, subsequent to Step S104, the information transmission method further includes: Step S105 of receiving, by the base station, a random access request from each UE, the random access request being carried on a Physical Random Access Channel (PRACH); Step S106 of determining whether or not the UE is in the idle state so as to acquire a second judgment result; and Step S107 of, in the case that the second judgment result indicates that the UE is in the idle state, enabling the base station not to respond to the random access request.

Here, in the case that the second judgment result indicates that the UE is not in the idle state, the base station may respond to the random access request being carried on the PRACH. In Steps S105 to S107, upon the receipt of the random access request representing that the UE in the idle state has already resided in the base station, the base station may not transmit a message response, e.g., a Random Access (RA) response, to the UE.

Step S101 may be implemented in the following modes.

In Mode 1, Step S101 of receiving, by the base station, the residence identification information from each UE in the idle state includes: Step S1011 of allocating, by the base station, a time-frequency resource for the residence identification information; and Step S1012 of retrieving, by the base station, the time-frequency resource so as to acquire the residence identification information, the residence identification information carrying UE identification information. Here, the UE identification information may be an International Mobile Subscriber Identification Number (IMSI) or an International Mobile Equipment Identity (IMEI).

In Mode 2, receiving, by the base station, the residence identification information from each UE in the idle state includes, in the case that the random access request procedure has been initiated by each UE in the idle state, receiving, by the base station, a random access request message from the UE in the idle state, the random access request message carrying the residence identification information. Here, the random access request procedure may be a PRACH procedure, and N bits in the random access request message may be occupied by the residence identification information, where N is an integer greater than or equal to 1.

In Mode 3, Step S101 of receiving, by the base station, the residence identification information from each UE in the idle state includes the following steps.

Step S1013: in the case the random access request procedure has been initiated by each UE in the idle state, receiving, by the base station, the random access request message from the UE in the idle state.

Step S1014: determining, by the base station, whether or not a sequence in the random access request message meets a predetermined third condition, so as to acquire a fourth judgment result.

Here, the third condition refers to one or more designated sequences. For example, the UE may initiate the random access request message, and select a designated sequence or preamble identifier to indicate that the UE has already resided in the base station. For example, the random access request message includes 1024 representation sequences or Random Access Preamble Identifiers (RAPIDs), and parts of the sequences may be merely used for cell residence identifiers (i.e., the residence identification information) through agreement. In the case that the UE uses these designated sequences to initiate the random access request, the base station may determine that the UE has already resided therein.

Step S1015: in the case that the fourth judgment result indicates that the representation sequence or RAPID of the random access request message has met the third condition, taking, by the base station, the representation sequence or RAPID of the random access request message as the residence identification information.

With respect to the modes where the residence identification information is transmitted by the base station, Step S103 of determining, by the base station, the number of the UEs in the idle state residing in the base station in accordance with the residence identification information may be implemented in the following modes.

In Mode 1, determining, by the base station, the number of the UEs in the idle state residing in the base station in accordance with the residence identification information includes: determining, by the base station, the number of the UEs in the idle state residing in the base station in accordance with the number of pieces of the UE identification information contained in the residence identification information.

In Mode 2, determining, by the base station, the number of the UEs in the idle state residing in the base station in accordance with the residence identification information includes: determining, by the base station, the number of the UEs in the idle state residing in the base station in accordance with the number of the random access request messages.

In Mode 3, determining, by the base station, the number of the UEs in the idle state residing in the base station in accordance with the residence identification information includes: Step S1031 of acquiring, by the base station, the residence identification information about a UE in an idle state residing in an adjacent base station; Step S1032 of comparing a timestamp of the residence identification information about the UE in the idle state residing in the adjacent base station with a timestamp of the residence identification information about the UE in the idle state residing in the base station, the timestamp may be a timestamp of transmission or reception for the residence identification information; and Step S1033 of, in the case that the timestamp of the residence identification information about the UE in the idle state residing in the adjacent base station is later than the timestamp of the residence identification information about the UE in the idle state residing in the base station, determining that the UE in the idle state is invalid so that the UE in the idle state is excluded in the case of determining the number of the UEs in the idle state.

In Mode 4, Step S103 of determining, by the base station, the number of the UEs in the idle state residing in the base station in accordance with the residence identification information includes: Step S1035 of removing the number of the UEs in the idle state corresponding to de-residence identification information and/or excluding the number of the UEs in the idle state corresponding to the de-residence identification information from the number of the UEs in the idle state; and Step S1036 of calculating, by the base station, the number of the UEs in the idle state residing in the base station in accordance with the UE identification information (IMSI, IMEI or PRACH sequences) carried in the residence identification information and the de-residence identification information from the UEs in the idle state.

In the case that the base station determines the number of the UEs in the idle state residing in the base station, and the residence identification information and the de-residence identification information carry the UE identification information (e.g., IMSI or IMEI), the base station may directly calculate the number of the UEs in the idle state in accordance with the IMSI or IMEI. In the case that the representation sequences or RAPIDs in the random access request message are specified by the UE as the representations of the residence identification information and the de-residence identification information, a set of sequences or RAPIDs indicating the residing state may be set, and each sequence or RAPID may be provided with a corresponding de-residence sequence or de-residence RAPID. For example, in the case that the UE selects a representation sequence 1 in the random access request message as the residence sequence, a representation sequence 1024 in the random access request message may be the de-residence sequence corresponding to the residence sequence. At this time, the base station may identify the representation sequence in the random access request message, so as to calculate the number of the valid residence UEs. In addition, the UE may also select an identical representation sequence in the random access request message as the residence sequence and the de-residence sequence. In the case that the base station has received the sequence for even-numbered times, it may determine that the UE has de-resided from the base station. In the case that the base station has received the sequence for odd-numbered times, it may determine that the UE has resided in the base station. The above-mentioned step may be performed in a similar manner in the case that specific RAPIDs are used as the a UE residence identifier and a UE de-residence identifier, which will not be particularly defined herein.

In order to solve the problems in prior art, the present disclosure further provides in some embodiments an information transmission method for use in a base station. A program code may be called by a processor of a base station so as to achieve functions of the information transmission method. The program code may be stored in a computer storage medium. Hence, the base station at least includes the processor and the storage medium.

Figure 2:
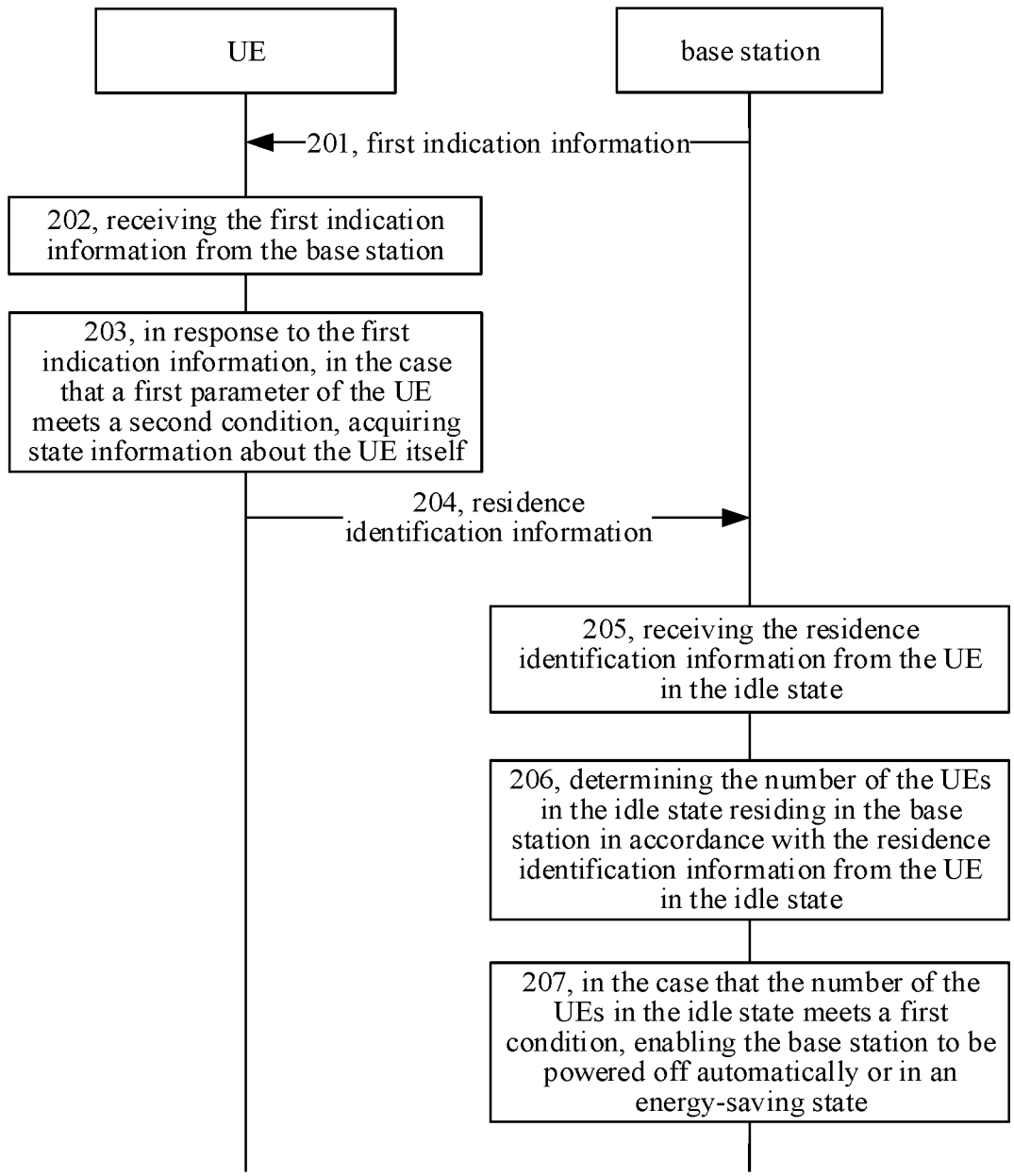
FIG. 2 is a flow chart of another information transmission method according to one embodiment of the present disclosure.

FIG. 2 is a flow chart of another information transmission method according to one embodiment of the present disclosure. As shown in FIG. 2, the information transmission method may include the following steps.

Step S201: transmitting, by the base station, first indication information to a UE. Here, Step S201 may include: Step S2011 of carrying, by the base station, the first indication information in a broadcast message; and Step S2012 of transmitting, by the base station, the broadcast message to the UE.

Here, the UE may transmit residence identification information in accordance with the first indication information. The first indication information carries therein a second condition about a first parameter of the UE, and the first indication information is used to instruct the UE to report or not report the residence identification information in the case that the first parameter of the UE has met the second condition. The first parameter of the UE is type information about the UE, electric quantity information about the UE, and mobility parameter information about the UE.

Step S202: receiving, by the UE, the first indication information from the base station. Here, the UE may receive the broadcast message carrying the first indication information.

Step S203: in response to the first indication information, acquiring, by the UE, state information about the UE itself in the case that the first parameter of the UE has met the second condition.

Step S204: in the case that the state information about the UE indicates that the UE is in an idle state, transmitting, by the UE, the residence identification information to the base station. Here, the UE may determine whether it is in a connected state or the idle state, so as to acquire a fifth judgment result. In the case that the fifth judgment result indicates that the UE is in the idle state, the UE may transmit the residence identification information to the base station.

Step S2041 of transmitting, by the UE, the residence identification information to the base station includes: transmitting, by the UE, the residence identification information on a time-frequency resource allocated by the base station, the residence identification information carrying UE identification information; or in the case that the UE has initiated a random access request procedure, transmitting, by the UE, a random access request message to the base station, the random access request message carrying the residence identification information; or in the case that the UE has initiated the random access request procedure, transmitting, by the UE, a random access request sequence or RAPID that has met a third condition to the base station.

Step S205: receiving, by the base station, the residence identification information from the UE in the idle state. Here, the residence identification information is used to indicate that the UE in the idle state has resided in the base station.

Step S206: determining, by the base station, the number of the UEs in the idle state residing in the base station in accordance with the residence identification information.

Step S207: in the case that the number of the UEs in the idle state has met the first condition, enabling the base station to be powered off automatically or to be in an energy-saving state, or suspending, by the base station, the transmission of the broadcast message for cell selection or cell re-selection of the UE in the idle state.

Here, the base station may determine whether or not the number of the UEs in the idle state meets the first condition, so as to acquire a first judgment result. In the case that the first judgment result indicates that the number of the UEs in the idle state has met the first condition, the base station may be powered off automatically or in the energy-saving state, or the transmission of the broadcast message for the cell selection or cell re-selection of the UE in the idle state may be suspended.

In a possible embodiment of the present disclosure, the information transmission method may further include, in the case that the first judgment result indicates that the number of the UEs in the idle state does not meet the first condition, terminating the entire procedure.

In a possible embodiment of the present disclosure, the information transmission method further includes: Step S208 of receiving, by the base station, residence identification information from the UE in the connected state; Step S209 of determining, by the base station, the number of the UEs in the connected state residing in the base station in accordance with the residence identification information from the UEs in the connected state; Step S210 of, in the case that the first judgment result indicates that the number of the UEs in the idle state has met the first condition, determining, by the base station, whether or not the number of the UEs in the connected state meets a second condition, so as to acquire a third judgment result; and Step S211 of, in the case that the third judgment result indicates that the number of the UEs in the connected state has met the second condition, enabling the base station to be powered off automatically or in the energy-saving state.

Here, the second condition is that the number of the UEs in the connected state is smaller than a second threshold. In the case that the number of the UEs in the connected state is smaller than the second threshold, the base station may be powered off automatically or in the energy-saving state, or the transmission of the broadcast message for the cell selection or cell re-selection of the UE in the idle state may be suspended.

In a possible embodiment of the present disclosure, the information transmission method may further include the following steps.

Step S212: in the case that the UE moves out of the coverage area of a resident cell, transmitting, by the UE, de-residence identification information to the base station. Here, the base station in Step S212 refers to a base station (i.e., a first base station) where the cell resides. Usually, during the cell re-selection, the UE may probably reselect a new base (i.e., a second base station different from the first base station) to reside therein, and at this time, the UE may transmit the de-residence identification information to the first base station.

The UE may transmit the de-residence identification information to the base station in the following three modes. In Mode 1, the UE may directly transmit the de-residence identification information to an original base station (i.e., an original resident base station) on a specific time-frequency resource. In Mode 2, the UE may initiate a random access request procedure, and the de-residence identification information may be carried in a newly-added Information Element (IE) in a random access request message. At this time, it is necessary to provide UE identification information, e.g., IMSI or IMEI. In Mode 3, the UE may initiate the random access request procedure, and a specific random access request message sequence or RAPID may be selected as the de-residence identification information.

Step S213: acquiring, by the base station, the de-residence identification information from the UE.

Here, with respect to the three modes in which the UE transmits the de-residence identification information to the base station, the base station may acquire the de-residence identification information from the UE in three modes.

In Mode 1, the base station may retrieve the time-frequency resource so as to acquire the de-residence identification information.

In Mode 2, the base station may receive the random access request message from the UE, and the de-residence identification information is carried in the random access request message. M bits in the random access request message may be occupied by the de-residence identification information, where M is an integer greater than or equal to 1.

In Mode 3, the step of acquiring, by the base station, the de-residence identification information from the UE may include the following steps.

Step S2131: receiving, by the base station, a random access request message from the UE in the idle state.

Step S2132: determining, by the base station, whether or not a random access request message sequence meets a predetermined fourth condition, so as to acquire a fifth judgment result. Here, similar to the third condition, the fourth condition refers to one or more designated sequences. For example, the UE may select a designated sequence so as to indicate that the UE has already de-resided from the base station. For example, there are 1024 random access request message sequences or RAPIDs, and merely parts of the random access request message sequences or RAPIDs may be used as de-residence identifiers (i.e., the de-residence identification information) through agreement. In the case that the above designated sequence or RAPID has been transmitted by the UE, the base station may determine that the UE has already de-resided from the base station.

It should be appreciated that, the de-residence identification information and the residence identification information may also be represented by an identical random access request message sequence or RAPID. In the case that the base station has received the random access request message sequence or RAPID for odd-numbered times, it means that the UE has already resided in the base station. In the case that the base station has received the designated random access request message sequence or RAPID for even-numbered times, it means that the UE has already de-resided from the base station.

Step S2133: in the case that the fifth judgment result indicates that the random access request message sequence or RAPID has met the fourth condition, determining, by the base station, the random access request message sequence or RAPID as the de-residence identification information.

The present disclosure further provides in some embodiments an information transmission method which includes the following steps.

Step S301: receiving, by a base station, residence identification information from a UE.

Here, after the UE in an idle state has already resided in the base station, it may transmit the residence identification information representing that the UE has already resided therein to the base station. It should be appreciated that, the UE in the idle state merely transmits the residence identification information, without any attempt to perform Radio Resource Control (RRC) connection. Then, the base station may acquire the residence identification information.

The base station may acquire the residence identification information in the following modes.

Mode 1: the base station may retrieve the residence identification information at a specific region.

It should be appreciated that, the base station may allocate certain time-frequency resources for this function, and periodically retrieve the time-frequency resources so as to acquire the residence identification information. The UE may transmit the residence identification information of the UE on a specific resource. The residence identification information may contain UE identification information, e.g., IMSI or IMEI.

Mode 2: the UE may initiate a random access request procedure. In the case that a random access request message sequence of a system is sufficiently long and a collision probability for the selection of an identical random access request message sequence by a plurality of UEs is relatively low, an IE for indicating that the UE has already resided in the base station may be added in a random access request message, so as to notify the base station that the UE has already resided therein. For example, a 1-bit IE may be added in the random access request message, and in the case that the bit is 1, it means that the UE has already resided in the base station. In a preferred embodiment of the present disclosure, the residence identification information needs to carry the UE identification information, e.g., IMSI or IMEI.

Mode 3: the UE may initiate the random access request procedure, and select a special sequence or RAPID to indicate that the UE has already resided in the base station. For example, there are 1024 random access request message sequences or RAPIDs, and parts of the sequences or RAP- IDs may be used merely as the residence identification information through agreement. In the case that the UE has initiated the random access request procedure using these sequences or RAPIDs, the base station may determine that the UE has already resided therein.

Step S302: acquiring, by the base station, the number of the UEs in the idle state residing in the base station.

With respect to the modes in which the base station acquires the residence identification information, the base station may acquire the number of the UEs in the idle state residing in the base station in the following modes.

Mode 1: the base station may calculate the number of the UEs residing in the base station in accordance with the UE identification information (e.g., IMSI, IMEI or PRACH sequence) carried in residence identification information and the de-residence identification information transmitted by the UE. In the case that the UE identification information, e.g., IMSI or IMEI, is carried in the residence identification information and the de-residence identification information, the number of the valid UEs residing in the base station may be calculated by the base station directly in accordance with the IMSI or IMEI.

Mode 2: in the case that specific random access request message sequences or RAPIDs are used by the UE to represent the residence identification information and the de-residence identification information, a set of sequences or RAPIDs indicating the residing state may be set, and each sequence or RAPID may be provided with a corresponding de-residence sequence or de-residence RAPID. For example, in the case that the UE selects the random access request message sequence 1 as the residence sequence, a the random access request message sequence 1024 may be the de-residence sequence corresponding to the residence sequence. At this time, the base station may identify the random access request message sequence, so as to calculate the number of the valid residence UEs. In addition, the UE may also select an identical random access request message sequence as the residence identification information and the de-residence identification information. In the case that the base station has received the sequence for even-numbered times, it may determine that the UE has de-resided from the base station. In the case that the base station has received the sequence for odd-numbered times, it may determine that the UE has resided in the base station. In this way, it is able to calculate the number of the UEs in the idle state residing in the base station.

Mode 3: in the case that the UE has de-resided from a current cell and does not transmit the de-residence identification information to the base station, the base station may interact with an adjacent cell so as to acquire the residence identification information about the UE in the idle state, and compare a timestamp of residence identification information about the UE in the adjacent cell with a timestamp of the residence identification information about the UE in the current cell, so as to determine whether or not the UE is currently residing in the current cell, thereby to calculate the number of the UEs in the idle state residing in the base station.

Step S303: in the case that the base station determines the number of the UEs in the connected state and the idle state is smaller than a predetermined first threshold and the UEs are currently residing within a coverage area overlapped by a coverage area of another base station, enabling the base station to be powered off.

In a possible embodiment of the present disclosure, in the case that the base station has received a PRACH access request representing that the UE in the idle state has already resided in the base station, the base station may not transmit a message response, e.g., a RA response, to the UE.

In a possible embodiment of the present disclosure, in order to reduce the power consumption of the UE due to the transmission of the residence identification information, the UE may transmit the residence identification information in accordance with a request from the base station. To be specific, the UE may transmit the residence identification information in the following modes.

Mode 1: A threshold may be set, and in the case that this threshold is triggered, the UE may transmit the residence identification information to the base station. For example, additional indication information may be carried in the broadcast message by the base station. For another example, the base station may enter an energy-saving mode, so as to reduce the transmission times of the broadcast message for the cell selection/re-selection, e.g., the base station may definitely instruct the UE to or not to report the residence identification information, and instruct the UEs of certain types to or not to report the residence identification information.

Mode 2: the UE of a designated type may not report the residence identification information. For example, it is unnecessary for the UEs with low Machine-to-Machine (M2M) mobility or without any movement to perform the cell selection/re-selection frequently, so these UEs may not report the residence identification information. For another example, in the case that electric quantity of the UE is smaller than a predetermined threshold, the UE may not report the residence identification information.

In a possible embodiment of the present disclosure, in the case that the UE has de-resided from the current cell, it may further transmit the de-residence identification information to the base station in the following modes. In Mode 1, the UE may transmit the de-residence identification information to the base station directly on a specific time-frequency resource. In Mode 2, the UE may initiate a random access request procedure, and the de-residence identification information may be carried in a newly-added IE of a random access request message. At this time, it is necessary to provide the UE identification information, e.g., IMSI or IMEI. In Mode 3, the UE may initiate the random access request procedure, and select a specific random access request message sequence as the de-residence identification information.

According to the embodiments of the present disclosure, the base station may receive the residence identification information from the UE in the idle state, and notify a network side of the UE residing in the base station and the timestamp about the initiation of the residence, so as to enable the network side to perform a paging operation accurately. The network side may page the UE in accordance with the up-to-date timestamp about the reception of the residence identification information of the UE by the network side. In addition, apart from performing an energy-saving operation by using the number of the UEs residing in the current cell, the base station may further perform the energy-saving operation in conjunction with the number of the UEs residing in the adjacent cell, and the number of the UEs residing in the adjacent cell may be acquired through interaction information between the base stations. As a result, according to the embodiments of the present disclosure, it is able to reduce the power consumption of the base station, and facilitate the network side to perform the paging operation accurately.

Based on the above-mentioned information transmission methods, the present disclosure further provides in some embodiments a base station. Units of the base station and modules of each unit may be implemented by processors or logic circuits in the base station. During the implementation, each processor may be a Central Processing Unit (CPU), a Micro Processing Unit (MPU), a Digital Signal Processor (DSP), a Field Programmable Gate Array (FPGA), or the like.

Figure 3:
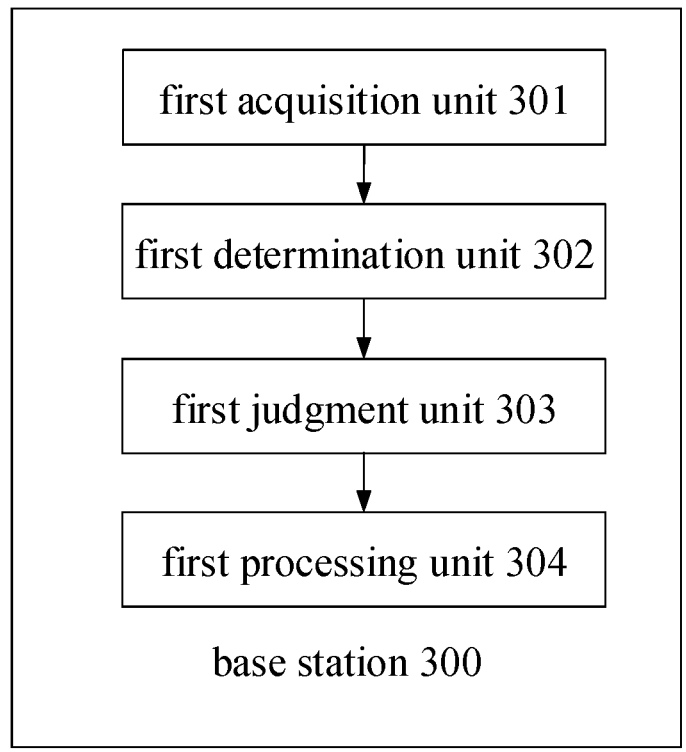
FIG. 3 is a schematic view showing a base station according to one embodiment of the present disclosure.

FIG. 3 is a schematic view showing a base station according to one embodiment of the present disclosure. As shown in FIG. 3, the base station 300 includes a first acquisition unit 301, a first determination unit 302, a first judgment unit 303 and a first processing unit 304. The first acquisition unit 305 is configured to acquire residence identification information from each UE in an idle state, and the residence identification information is used to indicate that the UE in the idle state resides in the base station. The first determination unit 306 is configured to determine the number of the UEs in the idle state residing in the base station in accordance with the residence identification information. The first judgment unit 307 is configured to judge whether or not the number of the UEs in the idle state meets a first condition, so as to acquire a first judgment result. The first processing unit 308 is configured to, in the case that the first judgment result indicates that the number of the UEs in the idle state meets the first condition, enable the base station to be powered off automatically or in an energy-saving, or enable the base station to suspend the transmission of a broadcast message for cell selection or cell re-selection of the UE in the idle state.

In a possible embodiment of the present disclosure, the base station further includes a first reception unit, a second judgment unit and a second processing unit. The first reception unit is configured to receive a random access request from the UE. The second judgment unit is configured to judge whether or not the UE is in the idle state, so as to acquire a second judgment result. The second processing unit is configured to, in the case that the second judgment result indicates that the UE is in the idle state, not respond to the random access request.

In a possible embodiment of the present disclosure, the base station further includes a second reception unit, a second determination unit and a third judgment unit. The second reception unit is configured to receive residence identification information from a UE in a connected state. The second determination unit is configured to determine the number of the UEs in the connected state residing in the base station in accordance with the residence identification information from the UEs in the connected state. The third judgment unit is configured to, in the case that the first judgment result indicates that the number of the UEs in the idle state meets the first condition, judge whether or not the number of the UEs in the connected state meets a second condition so as to acquire a third judgment result, and in the case that the third judgment result indicates that the number of the UEs in the connected state meets the second condition, trigger the first processing unit.

In a possible embodiment of the present disclosure, the first acquisition unit includes an allocation module and a retrieval module. The allocation module is configured to allocate a time-frequency resource for the residence identification information. The retrieval module is configured to retrieve the time-frequency resource so as to acquire the residence identification information carrying UE identification information.

In a possible embodiment of the present disclosure, the first acquisition unit is further configured to, in the case that the UE in the idle state initiates a random access request procedure, receive a random access request message sequence from the UE in the idle state. The residence identification information is carried in the random access request message sequence. Here, N bits in a random access request message are occupied by the residence identification information, where N is an integer greater than or equal to 1.

In a possible embodiment of the present disclosure, the first acquisition unit includes a reception module, a first judgment module and a determination module. The reception module is configured to, in the case that the UE in the idle state initiates the random access request procedure, receive a random access request message sequence or RAPID from the UE in the idle state. The first judgment module is configured to judge whether or not the random access request message sequence or RAPID meets a predetermined third condition so as to acquire a fourth judgment result. The determination module is configured to, in the case that the fourth judgment result indicates that the random access request message sequence or RAPID meets the third condition, determine the random access request message sequence or RAPID as the residence identification information.

In a possible embodiment of the present disclosure, the base station further includes a first transmission unit configured to transmit first indication information to the UE. The first indication information is used to instruct the UE to transmit the residence identification information.

In a possible embodiment of the present disclosure, the first transmission unit includes a carrying module and a first transmission module. The carrying module is configured to carry the first indication information in the broadcast message. The first transmission module is configured to transmit the broadcast message to the UE.

Here, the first indication information carries a second condition about a first parameter of the UE, and the first indication information is used to instruct the UE to report or not report the residence identification information in the case that the first parameter of the UE meets the second condition. The first parameter of the UE includes type information about the UE, electric quantity information about the UE and mobility parameter information about the UE.

In a possible embodiment of the present disclosure, the base station further includes a second acquisition unit configured to acquire de-residence identification information from the UE.

In a possible embodiment of the present disclosure, the first determination unit is further configured to determine the number of the UEs in the idle state residing in the base station in accordance with the number of pieces of UE identification information in the residence identification information, or determine the number of the UEs in the idle state residing in the base station in accordance with the number of the random access request messages.

In a possible embodiment of the present disclosure, the first determination unit includes a first acquisition module, a comparison module and a processing module. The first acquisition module is configured to acquire residence identification information from a UE in the idle state residing in an adjacent base station. The comparison module is configured to compare a timestamp about the transmission or reception of the residence identification information about the UE in the idle state residing in the adjacent base station with a timestamp about the transmission or reception of the residence identification information about the UE in the idle state residing in the current cell. The processing module is configured to, in the case that the timestamp about the transmission or reception of the residence identification information about the UE in the idle state residing in the adjacent base station is later than the timestamp about the transmission or reception of the residence identification information about the UE in the idle state residing in the current base station, determine the UE in the idle state as being invalid, so that such UE in the idle state is excluded from the number of the UEs in the idle state.

In a possible embodiment of the present disclosure, the first determination unit is further configured to remove the number of the UEs in the idle state corresponding to the de-residence identification information and/or exclude the number of the UEs in the idle state corresponding to the de-residence identification information from the number of the UEs in the idle state.

It should be appreciated that, the base station is described in a way similar to the above-mentioned information transmission method with an identical beneficial effect, which will not be particularly defined herein. In addition, any details not included in the embodiments involving the base station may refer to those mentioned in the embodiments involving the information transmission method, which will not be particularly defined herein.

Based on the above-mentioned information transmission methods, the present disclosure further provides in some embodiments a UE. Units of the UE and modules of each unit may be implemented by processors or logic circuits in the UE. During the implementation, each processor may be a CPU, a MPU, a DSP, a FPGA, or the like.

Figure 4:
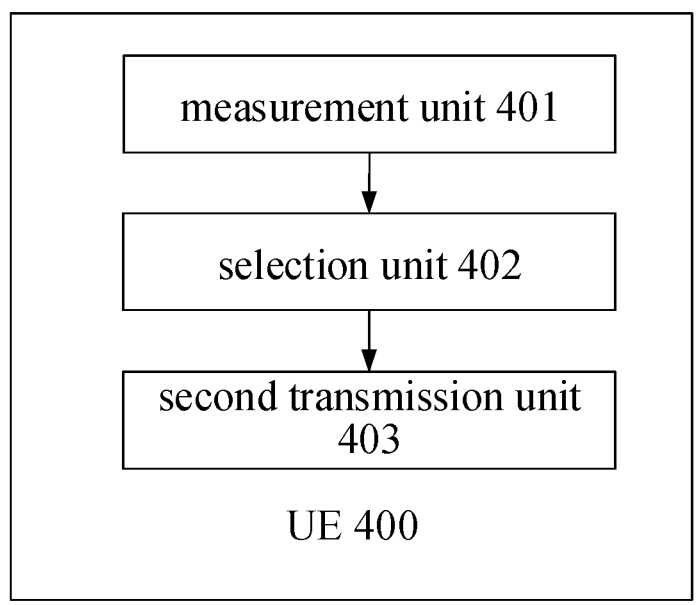
FIG. 4 is a schematic view showing a UE according to one embodiment of the present disclosure.

FIG. 4 is a schematic view showing a UE according to one embodiment of the present disclosure. As shown in FIG. 4, the UE 400 includes a measurement unit 401, a selection unit 402 and a second transmission unit 403. The measurement unit 401 is configured to preform idle state measurement for cell selection and cell re-selection. The selection unit 402 is configured to select a first base station in accordance with the idle state measurement and a cell selection criterion. The second transmission unit 403 is configured to transmit residence identification information to the first base station.

In a possible embodiment of the present disclosure, the second transmission unit 403 includes a second acquisition module, a second judgment module and a second transmission module. The second acquisition module is configured to acquire state information about the UE itself. The second judgment module is configured to judge whether the UE is in a connected state or an idle state, so as to acquire a fifth judgment result. The second transmission module is configured to, in the case that the fifth judgment result indicates that the UE is in the idle state, transmit the residence identification information to the first base station.

In a possible embodiment of the present disclosure, the UE further includes a third reception unit configured to receive first indication information from the first base station. The first indication information is used to indicate the UE in the idle state residing in the first base station to transmit the residence identification information to the first base station.

In a possible embodiment of the present disclosure, the third acquisition unit is further configured to transmit the residence identification information carrying UE identification information to the first base station on a time-frequency resource allocated by the first base station, or transmit a random access request carrying the residence identification information of the UE to the first base station, or transmit a random access request message sequence or RAPID that meets a third condition to the first base station.

It should be appreciated that, the UE is described in a way similar to the above-mentioned information transmission method with an identical beneficial effect, which will not be particularly defined herein. In addition, any details not included in the embodiments involving the UE may refer to those mentioned in the embodiments involving the information transmission method, which will not be particularly defined herein.

It should be appreciated that, in the embodiments of the present disclosure, in the case that the information transmission methods are implemented in a software form and sold or used as a separate product, they may be stored in a computer-readable storage medium. Based on this, the technical solutions of the present disclosure, partial or full, or parts of the technical solutions of the present disclosure contributing to the prior art, may appear in the form of software products, which may be stored in a storage medium and include several instructions so as to enable a computer equipment (a personal computer, a server, a network equipment, or the like) to execute all or parts of the steps of the method according to the embodiments of the present disclosure. The storage medium includes any medium capable of storing therein program codes, e.g., a Universal Serial Bus (USB) flash disk, a mobile Hard Disk (HD), a Read-Only Memory (ROM), a magnetic disk or an optical disk. Hence, the present disclosure may not be limited to any specific combination of hardware and software.

Correspondingly, the present disclosure further provides in some embodiments a computer storage medium storing therein a computer-executable instruction. The computer-executable instruction is configured to implement the information transmission method at the base station side or the UE side.

Correspondingly, the present disclosure further provides in some embodiments a base station, including a memory, a processor and a computer program stored in the memory and capable of running on the processor. The processor is configured to execute the computer programs, so as to implement the information transmission method at the base station side.

Correspondingly, the present disclosure further provides in some embodiments a UE, including a memory, a processor and a computer program stored in the memory and capable of running on the processor. The processor is configured to execute the computer programs, so as to implement the information transmission method at the UE side.

It should be appreciated that, such expressions as "one embodiment" and "the embodiment" in the entire description mean that the specific features, structures or characteristics are included in at least one embodiment of the present disclosure, so these expressions do not always refer to the same embodiment. In addition, the specific features, structures or characteristics may be combined in one or more embodiments in any appropriate form. It should be further appreciated that, in the embodiments of the disclosure, serial numbers of the steps are not used to define an order thereof, and instead, the order of the steps shall be determined in accordance with the functions as well as internal logic thereof, and are not used to define the procedure of the implementation. In addition, serial numbers of the embodiments are for illustrative purposes only, and none of them is superior to the others.

Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

It should be further appreciated that, the device and method may be implemented in any other ways. For example, the embodiments for the device are merely for illustrative purposes, and the modules or units are provided merely on the basis of their logic functions. The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together. Each unit may be implemented in the form of hardware, or hardware plus a software function unit.

It should be further appreciated that, all or parts of the steps in the method may be implemented by related hardware using a program stored in a computer-readable storage medium. The program is executed so as to perform the steps. The storage medium includes any medium capable of storing therein program codes, e.g., a mobile storage device, a ROM, a magnetic disk or an optical disk.

Alternatively, in the case that the functional units are implemented in a software form and sold or used as a separate product, they may be stored in a computer-readable storage medium. Based on this, the technical solutions of the present disclosure, partial or full, or parts of the technical solutions of the present disclosure contributing to the prior art, may appear in the form of software products, which may be stored in a storage medium and include several instructions so as to enable a computer equipment (a personal computer, a server, a network equipment, or the like) to execute all or parts of the steps of the method according to the embodiments of the present disclosure. The storage medium includes any medium capable of storing therein program codes, e.g., a mobile storage device, a ROM, a RAM, a magnetic disk or an optical disk.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure. A protection scope of the present disclosure is defined by claims.

INDUSTRIAL APPLICABILITY

According to the embodiments of the present disclosure, the base station acquires the residence identification information from the UE in the idle state, and the residence identification information is used to indicate that the UE in the idle state resides in the base station. The base station determines identifiers of the UEs in the idle state and/or the number of the UEs in the idle state residing in the base station in accordance with the residence identification information. The base station reports, to a network side, the identifiers of the UEs in the idle state residing in the base station or the identification information about the UEs in the idle state residing in the base station, and timestamp information about the transmission of the residence identification information from the UE or timestamp information about the reception of the residence identification information by the base station. Hence, the network side may perform an accurate paging operation in accordance with the above information, so as to reduce a paging overhead at the network side, and shorten a time delay for the service creation.

What is claimed is:

1. An information transmission method, comprising:
   acquiring, by a base station, residence identification information from each User Equipment (UE) in an idle state, wherein the residence identification information is used to identify that the UE in the idle state resides in the base station; and
   determining, by the base station, identifiers of the UEs in the idle state residing in the base station, or the number of the UEs in the idle state residing in the base station, or the identifiers of the UEs in the idle state residing in the base station and the number of the UEs in the idle state residing in the base station in accordance with the residence identification information,
   wherein the step of acquiring, by the base station, the residence identification information from each UE in the idle state comprises:
   allocating, by the base station, a time-frequency resource for the residence identification information; and retrieving, by the base station, the time-frequency resource to acquire the residence identification information, wherein the residence identification information carries UE identification information; or
   in the case of initiating a random access request procedure by the UE in the idle state, receiving, by the base station, a random access request from the UE in the idle state, the random access request carrying the residence identification information, wherein in the case of initiating the random access request procedure to the base station by the UE in the idle state, determining, by the base station, whether or not sequence information in the random access request meets a predefined condition; and in the case of determining that the sequence information in the random access request meets the predefined condition, determining, by the base station, the sequence information as the residence identification information, wherein the step of determining, by the base station, the number of the UEs in the idle state residing in the base station in accordance with the residence identification information comprises:

acquiring, by the base station, the residence identification information from the UE in the idle state residing in an adjacent base station; comparing a timestamp about transmission or reception of the residence identification information about the UE in the idle state residing in the adjacent base station with a timestamp about transmission or reception of the residence identification information about the UE in the idle state residing in a current cell; in the case that the timestamp about the transmission or reception of the residence identification information about the UE in the idle state residing in the adjacent base station is later than the timestamp about the transmission or reception of the residence identification information about the UE in the idle state residing in the current base station, determining, by the base station, the UE in the idle state as being invalid; and removing the UEs in the idle state corresponding to de-residence identification information; or excluding the number of the UEs in the idle state corresponding to the de-residence identification information from the number of the UEs in the idle state; or removing the UEs in the idle state corresponding to the de-residence identification information, and excluding the number of the UEs in the idle state corresponding to the de-residence identification information from the number of the UEs in the idle state.

2. The information transmission method according to claim 1, further comprising:

in the case that the number of the UEs in the idle state meets a predetermined first condition, enabling the base station to be powered off automatically or in an energy-saving state, or enabling the base station to suspend transmission of a broadcast message for cell selection or cell reselection of the UEs in the idle state; or in the case that the number of the UEs in the idle state meets the first condition, determining, by the base station, the number of UEs in a connected state meets a predetermined second condition; and in the case that the number of the UEs in the connected state meets the second condition, enabling the base station to be powered off automatically or in the energy-saving state, or enabling the base station to suspend transmission of the broadcast message for cell selection or cell re-selection of the UEs in the idle state.

3. The information transmission method according to claim 1, further comprising:

reporting, by the base station, the identifiers of the UEs residing in the base station to a network side; or reporting, by the base station, the identifiers of the UEs residing in the base station, and a timestamp about transmission of the residence identification information by each UE or a timestamp about reception of the residence identification information by the base station to the network side, wherein the network side is configured to page for the UE in accordance with the identifier of the UE residing in the base station, or identification information about the UE in the idle state, or the timestamp about the transmission of the residence identification information by the UE, or the timestamp about the reception of the residence identification information by the base station.

4. The information transmission method according to claim 1, further comprising:

transmitting, by the base station, first indication information to the UE in the idle state, wherein the first indication information is used to instruct the UE in the idle state to transmit the residence identification information, and a broadcast message or a paging message carries the first indication information, wherein the first indication information carries a second condition about a first parameter of the UE; the first indication information is used to indicate the residence identification information reported in the case that the first parameter of the UE meets the second condition or indicate to not report the residence identification information; and the first parameter of the UE comprises type information about the UE, electric quantity information about the UE, mobility parameter information about the UE.

5. The information transmission method according to claim 1, further comprising:

acquiring, by the base station, de-residence identification information from the UE, wherein the step of acquiring, by the base station, the de-residence identification information from the UE comprises: retrieving, by the base station, time-frequency resource to acquire the de-residence identification information; or receiving, by the base station, random access request from the UE, wherein the random access request carries the de-residence identification information; or receiving, by the base station, the random access request from the UE, and in the case that sequence information in the random access request meets a fourth condition, determining, by the base station, the sequence information in the random access request as the de-residence identification information.

6. The information transmission method according to claim 1, wherein the step of determining, by the base station, the identifiers of the UEs in the idle state residing in the base station, or the number of the UEs in the idle state residing in the base station, or the identifiers of the UEs in the idle state residing in the base station and the number of the UEs in the idle state residing in the base station in accordance with the residence identification information comprises: determining, by the base station, the identifiers of the UEs in the idle state residing in the base station in accordance with the UE identification information in the residence identification information; or determining, by the base station, the number of the UEs in the idle state residing in the base station in accordance with the UE identification information in the residence identification information; or determining, by the base station, the identifiers of the UEs in the idle state residing in the base station in accordance with the UE identification information in the residence identification information, and determining, by the base station, the number of the UEs in the idle state residing in the base station in accordance with the UE identification information in the residence identification information.

7. The information transmission method according to claim 1, further comprising:
receiving, by the base station, a random access request from the UE; and
in the case of determining that the UE is in the idle state according to the random access request, enabling the base station not to respond to the random access request.

8. An information transmission method, comprising:
performing, by a User Equipment (UE), idle state measurement for cell selection and cell re-selection;
selecting, by the UE, a first base station in accordance with the idle state measurement and a cell selection criterion;
receiving, by the UE, first indication information from the first base station, wherein the first indication information is used to instruct the UE in the idle state residing in the first base station to transmit residence identification information to the first base station; and
transmitting, by the UE, the residence identification information to the first base station, to enable the first base station to determine identifiers of the UEs in the idle state residing in the base station, or the number of the UEs in the idle state residing in the base station, or the identifiers of the UEs in the idle state residing in the base station and the number of the UEs in the idle state residing in the base station in accordance with the residence identification information,
wherein the step of transmitting, by the UE, the residence identification information to the first base station comprises:
transmitting, by the UE, the residence identification information on a time-frequency resource allocated by the first base station, wherein the residence identification information carries UE identification information; or
transmitting, by the UE, a random access request to the first base station, wherein the random access request carries the residence identification information of the UE; or
transmitting, by the UE, a random access sequence or a Random Access Preamble Identifier (RAPID) that meets a predefined condition to the first base station,
wherein the step of determining, by the base station, the number of the UEs in the idle state residing in the base station in accordance with the residence identification information comprises:
acquiring, by the base station, the residence identification information from the UE in the idle state residing in an adjacent base station; comparing a timestamp about transmission or reception of the residence identification information about the UE in the idle state residing in the adjacent base station with a timestamp about transmission or reception of the residence identification information about the UE in the idle state residing in a current cell; in the case that the timestamp about the transmission or reception of the residence identification information about the UE in the idle state residing in the adjacent base station is later than the timestamp about the transmission or reception of the residence identification information about the UE in the idle state residing in the current base station, determining, by the base station, the UE in the idle state as being invalid; and
removing the UEs in the idle state corresponding to de-residence identification information; or excluding the number of the UEs in the idle state corresponding to the de-residence identification information from the number of the UEs in the idle state; or removing the UEs in the idle state corresponding to the de-residence identification information, and excluding the number of the UEs in the idle state corresponding to the de-residence identification information from the number of the UEs in the idle state.

9. The information transmission method according to claim 8, further comprising: subsequent to the step of transmitting, by the UE, the residence identification information to the first base station,
in the case that a cell belonging to a second base station is re-selected by the UE, transmitting, by the UE, de-residence identification information to the first base station,
wherein the step of transmitting, by the UE, the de-residence identification information to the first base station comprises: transmitting, by the UE, the de-residence identification information on time-frequency resource allocated by the first base station, wherein the de-residence identification information carries UE identification information; or transmitting, by the UE, random access request to the first base station, wherein the random access request carries the de-residence identification information of the UE; or transmitting, by the UE, a random access sequence or a RAPID that meets a fourth condition to the first base station.

10. A base station, comprising a memory, a processor and a computer program being stored in the memory and capable of running on the processor, wherein the processor is configured to execute the computer program to:
acquire residence identification information from each User Equipment (UE) in an idle state, wherein the residence identification information is used to identify that the UE in the idle state resides in the base station; and
determine identifiers of the UEs in the idle state residing in the base station, or the number of the UEs in the idle state residing in the base station, or the identifiers of the UEs in the idle state residing in the base station and the number of the UEs in the idle state residing in the base station in accordance with the residence identification information,
wherein the processor is further configured to execute the computer program to:
allocate a time-frequency resource for the residence identification information; and retrieve the time-frequency resource to acquire the residence identification information, wherein the residence identification information carries UE identification information; or
in the case of initiating a random access request procedure by the UE in the idle state, receive a random access request from the UE in the idle state, the random access request carrying the residence identification information, wherein in the case of initiating the random access request procedure to the base station by the UE in the idle state, determine whether or not sequence information in the random access request meets a predefined condition; and in the case of determining that the sequence information in the random access request meets the predefined condition, determine the sequence information as the residence identification information,
wherein the processor is further configured to execute the computer program to:

acquire the residence identification information from the UE in the idle state residing in an adjacent base station; compare a timestamp about transmission or reception of the residence identification information about the UE in the idle state residing in the adjacent base station with a timestamp about transmission or reception of the residence identification information about the UE in the idle state residing in a current cell; in the case that the timestamp about the transmission or reception of the residence identification information about the UE in the idle state residing in the adjacent base station is later than the timestamp about the transmission or reception of the residence identification information about the UE in the idle state residing in the current base station, determine the UE in the idle state as being invalid; and remove the UEs in the idle state corresponding to de-residence identification information; or exclude the number of the UEs in the idle state corresponding to the de-residence identification information from the number of the UEs in the idle state; or remove the UEs in the idle state corresponding to the de-residence identification information, and exclude the number of the UEs in the idle state corresponding to the de-residence identification information from the number of the UEs in the idle state.

11. The base station according to claim 10, wherein the processor is further configured to execute the computer program to:

in the case that the number of the UEs in the idle state meets a predetermined first condition, enable the base station to be powered off automatically or in an energy-saving state, or enable the base station to suspend transmission of a broadcast message for cell selection or cell reselection of the UEs in the idle state.

12. The base station according to claim 11, wherein the processor is further configured to execute the computer program to:

acquire the residence identification information about the UE in the idle state residing in an adjacent base station;

compare a timestamp about transmission or reception of the residence identification information about the UE in the idle state residing in the adjacent base station with a timestamp about the transmission or reception of the residence identification information about the UE in the idle state residing in a current cell; and in the case that the timestamp about the transmission or reception of the residence identification information about the UE in the idle state residing in the adjacent base station is later than the timestamp about the transmission or reception of the residence identification information about the UE in the idle state residing in the current base station, determine the UE in the idle state as being invalid.

13. The base station according to claim 10, wherein the processor is further configured to execute the computer program to:

receive a random access request from the UE;

in the case of determining that the UE is in the idle state according to the random access request, not respond to the random access request; and in the case that the number of the UEs in the idle state meets a first condition, judge whether or not the number of the UEs in a connected state meets a second condition, and in the case that the number of the UEs in the connected state meets the second condition, trigger a first processing unit.

14. The base station according to claim 10, wherein the processor is further configured to execute the computer program to:

transmit first indication information to the UE in the idle state, wherein the first indication information is used to instruct the UE to transmit the residence identification information, and a broadcast message or a paging message carries the first indication information; and remove the UEs in the idle state corresponding to de-residence identification information, or exclude the number of the UEs in the idle state corresponding to the de-residence identification information from the number of the UEs in the idle state, or remove the UEs in the idle state corresponding to the de-residence identification information and exclude the number of the UEs in the idle state corresponding to the de-residence identification information from the number of the UEs in the idle state.

15. A User Equipment (UE), comprising a memory, a processor and a computer program being stored in the memory and capable of running on the processor, wherein the processor is configured to execute the computer program to:

perform idle state measurement for cell selection and cell re-selection;

select a first base station in accordance with the idle state measurement and a cell selection criterion;

receive first indication information from the first base station, wherein the first indication information is used to instruct the UE in the idle state residing in the first base station to transmit residence identification information to the first base station; and transmit the residence identification information to the first base station, to enable the first base station to determine identifiers of the UEs in the idle state residing in the base station, or the number of the UEs in the idle state residing in the base station, or the identifiers of the UEs in the idle state residing in the base station and the number of the UEs in the idle state residing in the base station in accordance with the residence identification information, wherein the processor is further configured to execute the computer program to:

transmit the residence identification information on a time-frequency resource allocated by the first base station, wherein the residence identification information carries UE identification information; or transmit a random access request to the first base station, wherein the random access request carries the residence identification information of the UE; or transmit a random access sequence or a RAPID that meets a predefined condition to the first base station, wherein the processor is further configured to execute the computer program to:

acquire the residence identification information from the UE in the idle state residing in an adjacent base station; compare a timestamp about transmission or reception of the residence identification information about the UE in the idle state residing in the adjacent base station with a timestamp about transmission or reception of the residence identification information about the UE in the idle state residing in a current cell; in the case that the timestamp about the transmission or reception of the residence identification information about the UE in the idle state residing in the adjacent base station is later than the timestamp about the transmission or reception of the residence identification information about the UE in the idle state residing in the current base station, determine the UE in the idle state as being invalid; and
remove the UEs in the idle state corresponding to de-residence identification information; or exclude the number of the UEs in the idle state corresponding to the de-residence identification information from the number of the UEs in the idle state; or remove the UEs in the idle state corresponding to the de-residence identification information, and exclude the number of the UEs in the idle state corresponding to the de-residence identification information from the number of the UEs in the idle state.

* * * * *